US008516677B2

(12) United States Patent
Coleman, Sr. et al.

(10) Patent No.: US 8,516,677 B2
(45) Date of Patent: Aug. 27, 2013

(54) METHOD FOR REMOVING AN AUXILIARY CONTACT DEVICE FROM A MOTOR CONTROLLER UNIT

(75) Inventors: Benjamin Floyd Coleman, Sr., Winston Salem, NC (US); Robert Eugene Weaver, High Point, NC (US); Charles Julius Van Hoorne, Kernersville, NC (US)

(73) Assignee: R.J.Reynolds Tobacco Company, Winston-Salem, NC (US)

( * ) Notice: Subject to any disclaimer, the term of this patent is extended or adjusted under 35 U.S.C. 154(b) by 223 days.

(21) Appl. No.: 12/796,006

(22) Filed: Jun. 8, 2010

(65) Prior Publication Data

US 2011/0296659 A1 Dec. 8, 2011

(51) Int. Cl.
*B25B 27/14* (2006.01)
*B23P 11/00* (2006.01)

(52) U.S. Cl.
USPC ............................ 29/426.1; 29/426.5; 29/764

(58) Field of Classification Search
USPC ............................................. 29/426.1, 426.5
See application file for complete search history.

(56) References Cited

U.S. PATENT DOCUMENTS 2,217,524 A * 10/1940 Neuschwanger et a. ........ 66/118
2,440,413 A * 4/1948 Mock ............................. 66/118
2,635,444 A * 4/1953 Carlson ........................... 66/118
3,112,852 A * 12/1963 Norden et al. ................ 225/104
3,896,535 A * 7/1975 Tucci .............................. 29/747
5,367,761 A * 11/1994 Kabat et al. ..................... 29/764
7,874,182 B1 * 1/2011 Lindahl ........................... 66/118
2003/0194903 A1 * 10/2003 Tso-Chin ...................... 439/484
2011/0222268 A1 * 9/2011 Pearson et al. ................ 362/119

* cited by examiner

*Primary Examiner* — Minh Trinh
(74) *Attorney, Agent, or Firm* — Womble Carlyle Sandridge & Rice,LLP

(57) ABSTRACT

A method and associated apparatus are provided for removing an auxiliary contact device from a motor starter assembly engaged with a motor controller unit of a motor control center. The method includes engaging an extraction tool with a securement member operably engaged between the auxiliary contact device and the motor starter assembly. The extraction tool includes a handle portion and a securement-engaging portion. The handle portion extends along the auxiliary contact device for the securement-engaging portion to engage the securement member. The method further includes exerting an axial force on the handle portion such that the handle portion cooperates with the securement-engaging portion to disengage the securement member from between the auxiliary contact device and the motor starter assembly, and to disengage the electrically-conductive engagement between the auxiliary contact device and the motor starter assembly, to remove the auxiliary contact device from the motor starter assembly.

6 Claims, 8 Drawing Sheets

METHOD FOR REMOVING AN AUXILIARY CONTACT DEVICE FROM A MOTOR CONTROLLER UNIT

BACKGROUND OF THE INVENTION

1. Field of the Invention

The present invention relates to motor control centers and, more particularly, to a method for removing an auxiliary contact from a motor controller unit housed in a motor control center, and an associated apparatus.

2. Description of Related Art

A motor control center (MCC) is a modular cabinet system for powering and controlling motors, and may typically be found in a manufacturing or factory setting. The MCC is an assembly of one or more enclosed sections having a common power bus and principally containing motor control units. Such motor control units are housed in so-called "buckets" received within the MCC cabinet. The motor control units may include one or more motor starters, which are electrically-operated switches using magnetic induction to provide the startup current for a motor. Each motor starter includes one or more auxiliary contact devices (so-called "blocks"), which function to provide memory to control circuits, to show operational status of equipment, to show faults with the equipment, and/or to complete the circuit for another pierce of equipment.

Unfortunately, the auxiliary contact devices can fail and, in those instances, must be replaced. A typical MCC may have 20-30 buckets and, thus, each MCC includes a relatively large quantity of auxiliary contact devices which at some point will need replacing. To replace an auxiliary contact device, the bucket containing the auxiliary contact device must be removed from the MCC cabinet because the walls of the bucket generally prevent the auxiliary contact device from being accessed and removed while the bucket is still positioned within the MCC cabinet. Removing a single bucket from the MCC, however, terminates the overall circuit and shuts down the MCC.

As such, it would be desirable to provide a method and associated apparatus capable of removing an auxiliary contact device from a motor starter without removing the bucket from the MCC cabinet, so as to reduce instances of downtime of the MCC for replacing such auxiliary contact devices and, for instance, to reduce the risk of electrical shock to an operator performing such a replacement.

BRIEF SUMMARY OF THE INVENTION

The above and other needs are met by the present invention which, according to one aspect, provides a method for removing an auxiliary contact device from a motor starter assembly engaged with a motor controller unit of a motor control center. The method comprises engaging an extraction tool with a securement member operably engaged between the auxiliary contact device and the motor starter assembly. The auxiliary contact device is secured by the securement member in electrically-conductive engagement with the motor starter assembly. The extraction tool has a handle portion and a securement-engaging portion. The handle portion is configured to extend along the auxiliary contact device for the securement-engaging portion to engage the securement member. The method further comprises exerting an axial force on the handle portion such that the handle portion cooperates with the securement-engaging portion to disengage the securement member from between the auxiliary contact device and the motor starter assembly, and to disengage the electrically-conductive engagement between the auxiliary contact device and the motor starter assembly, to remove the auxiliary contact device from the motor starter assembly.

Another aspect of the present invention provides an extraction tool adapted for removing an auxiliary contact device from a motor starter assembly engaged with a motor controller unit of a motor control center, wherein the auxiliary contact device and the motor starter assembly having a securement member operably engaged therebetween for securing the auxiliary contact device in electrically-conductive engagement with the motor starter assembly. The extraction tool includes a handle portion configured to extend along the auxiliary contact device toward the securement member. The extraction tool further includes a securement-engaging portion operably engaged with the handle portion. The securement-engaging portion is configured to engage the securement member such that an axial force exerted on the handle portion causes the securement-engaging portion to disengage the securement member from between the auxiliary contact device and the motor starter assembly, disengages the electrically-conductive engagement between the auxiliary contact device and the motor starter assembly, and removes the auxiliary contact device from the motor starter assembly.

Embodiments of the present invention thus provide advantages as otherwise detailed herein.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
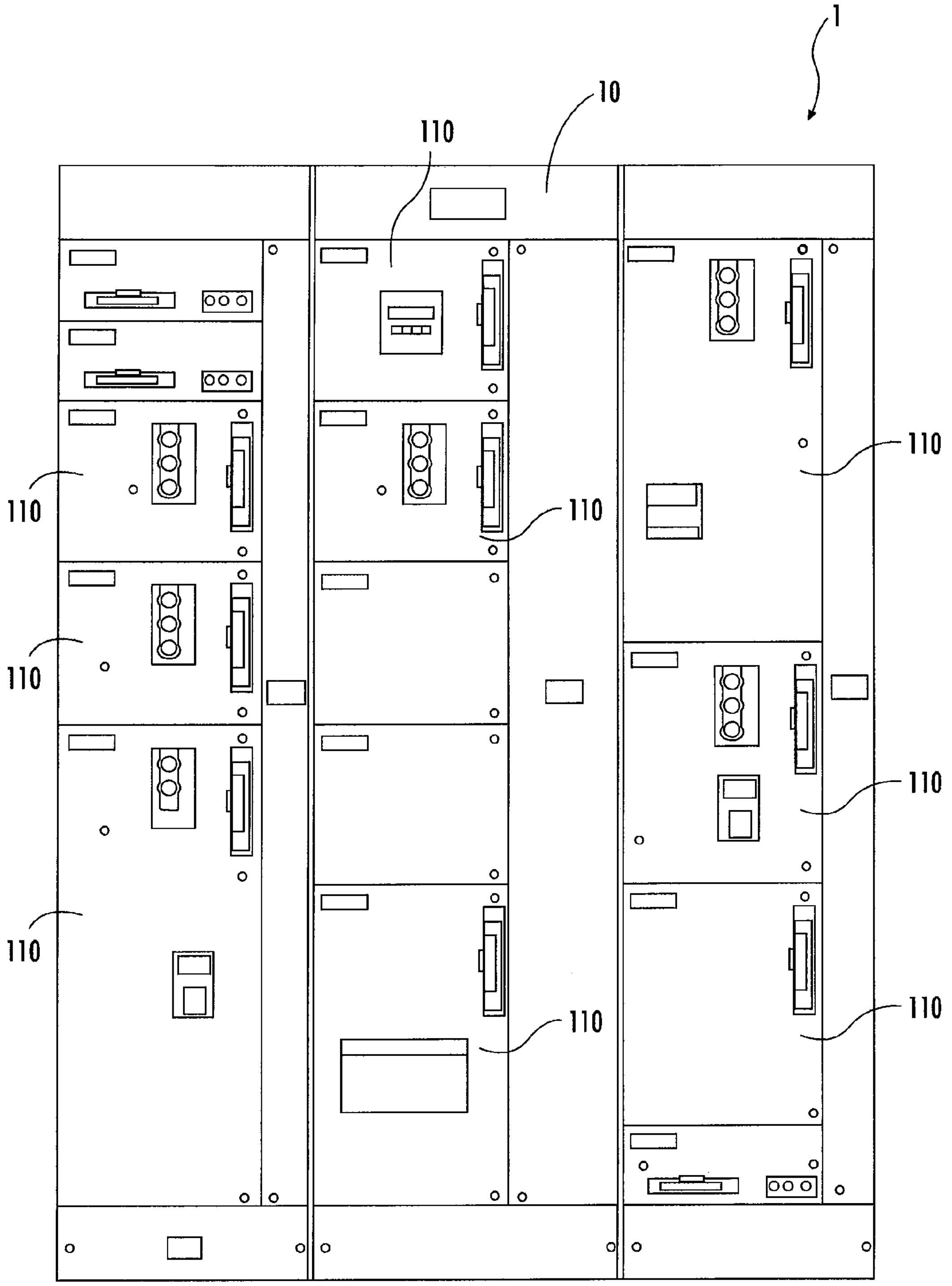
FIG. 1 is an elevation view of an ALLEN-BRADLEY CENTERLINE 2100 Motor Control Center capable of implementing various embodiments of the present invention.
Figure 2:
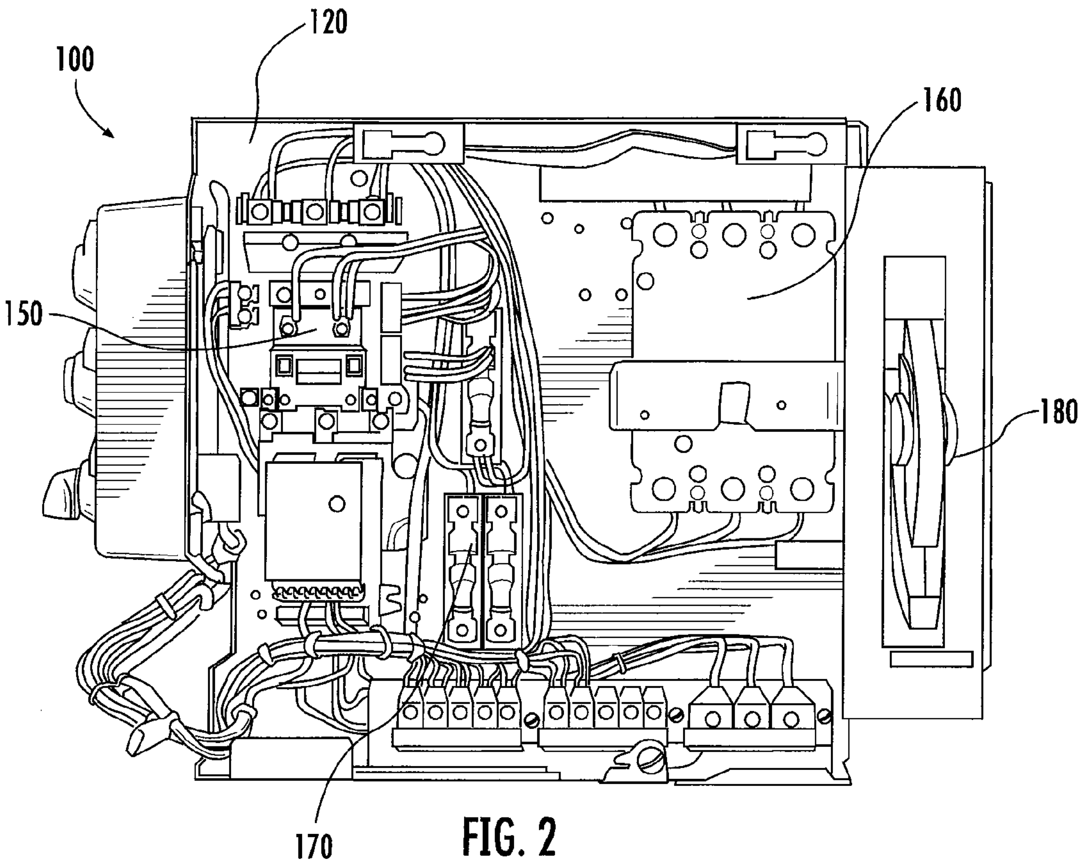
FIG. 2 is a perspective view of a motor controller unit for a motor control center.

FIG. 1 illustrates a motor control center (MCC) 1 for powering and controlling motors. Representative types of motor control centers and the components thereof are available from Rockwell Automation, Inc. such as, for example, the ALLEN-BRADLEY CENTERLINE 2100 Motor Control Center. The MCC 1 includes a cabinet 10 having a plurality of receptacles for receiving one or more motor controller units 100 (FIG. 2). A door member 110 (see also FIG. 3) may be hingedly attached to the motor controller unit 100 or the cabinet 10 such that the internal components of the motor controller unit 100 can be accessed. The motor controller unit 100 is removable from the cabinet 10. In some instances, the motor controller unit 100 may be configured to slide on a rail system for sliding the motor controller unit 100 in and out of the cabinet 10.

Figure 3:
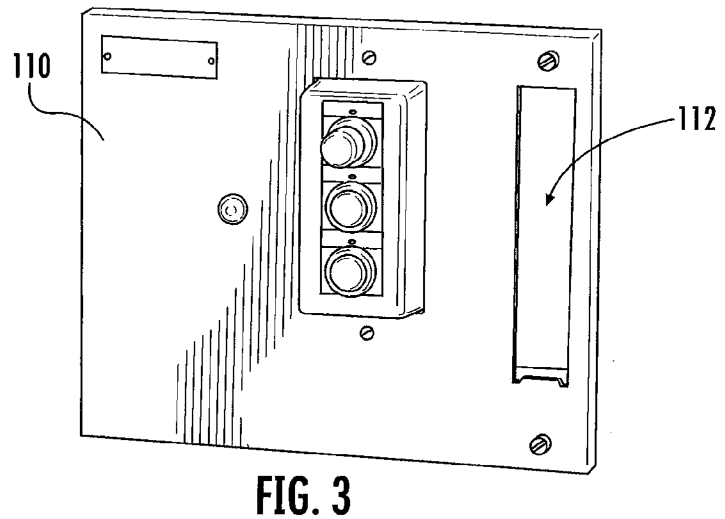
FIG. 3 is a perspective view of a door member for use with the motor controller unit in FIG. 2.

FIG. 2 illustrates a motor controller unit 100 capable of implementation in the MCC 1. The motor controller unit 100 includes a housing bucket 120 for housing the components forming the motor controller unit 100. The motor controller unit 100 may include components such as, for example, a motor starter assembly 150, a circuit breaker 160, and a control power transformer 170. In some instances, the motor controller unit 100 may include a motor contactor assembly (not shown). The housing bucket 120 may be arranged so as to be removable from the cabinet 10 (FIG. 1). As shown in FIG. 3, the door member 110 may define a cutout 112 for receiving a disconnect handle 180 therethrough.

Figure 4:
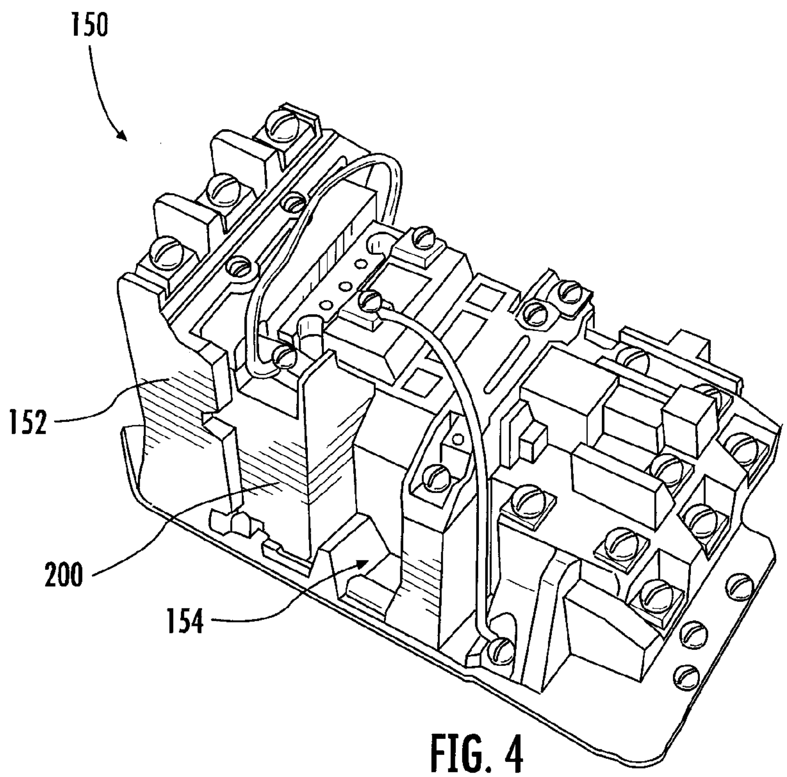
FIGS. 4 and 5 are perspective views of an ALLEN-BRADLEY 509-BOD motor starter assembly for a motor controller unit.
Figure 5:
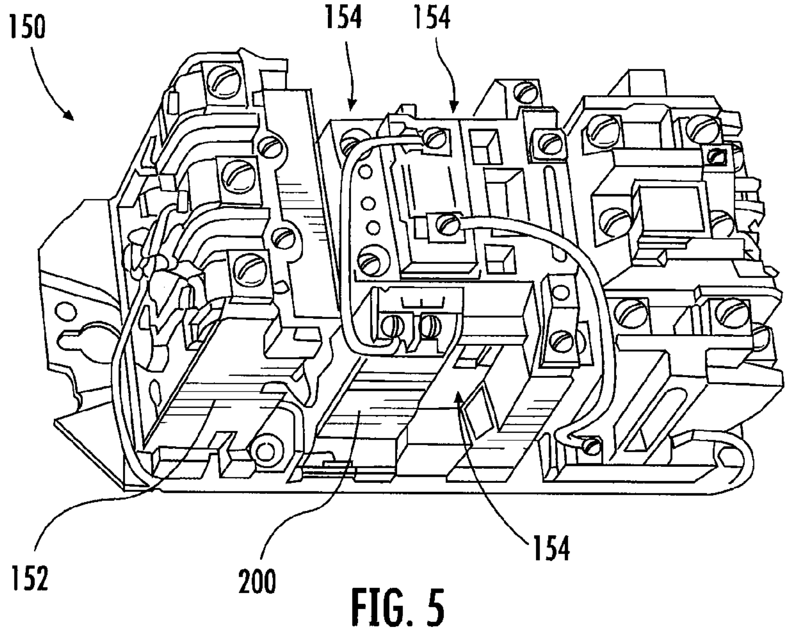

FIGS. 4 and 5 illustrate the motor starter assembly 150 as removed from the motor controller unit 100. The motor starter assembly 150 includes a motor starter body 152 defining one or more receptacles 154 for receiving an auxiliary contact device 200. The auxiliary contact device 200 is releasably engaged with the motor starter body 152. In this regard, the auxiliary contact device 200 may be engaged with the motor starter body 152 in, for example, a snap or interference fit. Representative motor starter assemblies are available from ALLEN-BRADLEY such as, for example, the 509-BOD model. While the disclosure provided herein is directed to motor starter assemblies and auxiliary contact devices therefor, it is understood that motor contactor assemblies also employ auxiliary contact devices and the embodiments of the present invention as disclosed herein may also be used in conjunction with auxiliary contact devices of such motor contactor assemblies.

Figure 6:
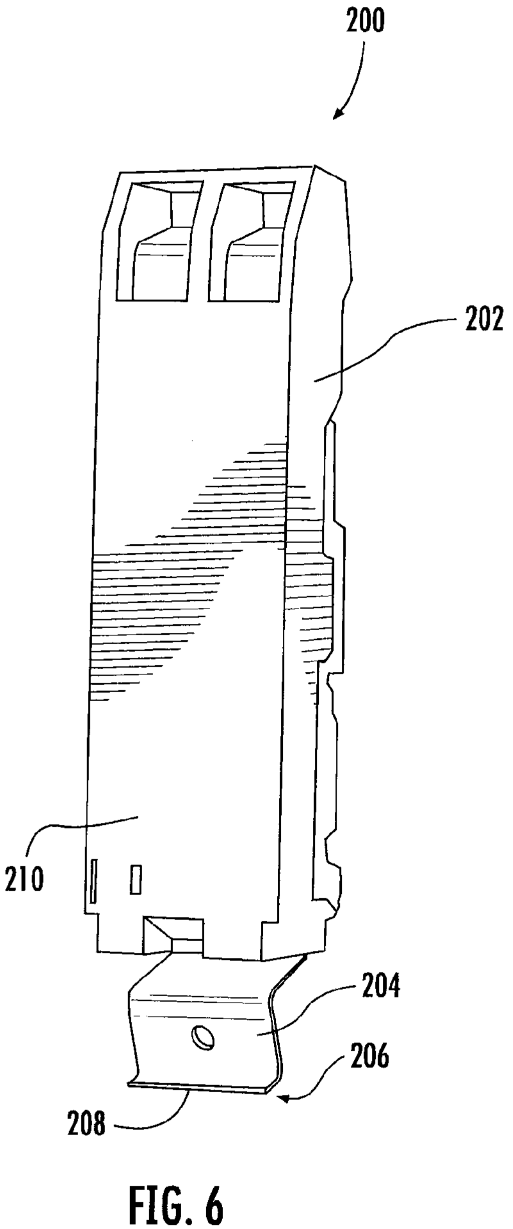
FIG. 6 is a perspective front view of an ALLEN-BRADLEY 595-A auxiliary contact device.
Figure 7:
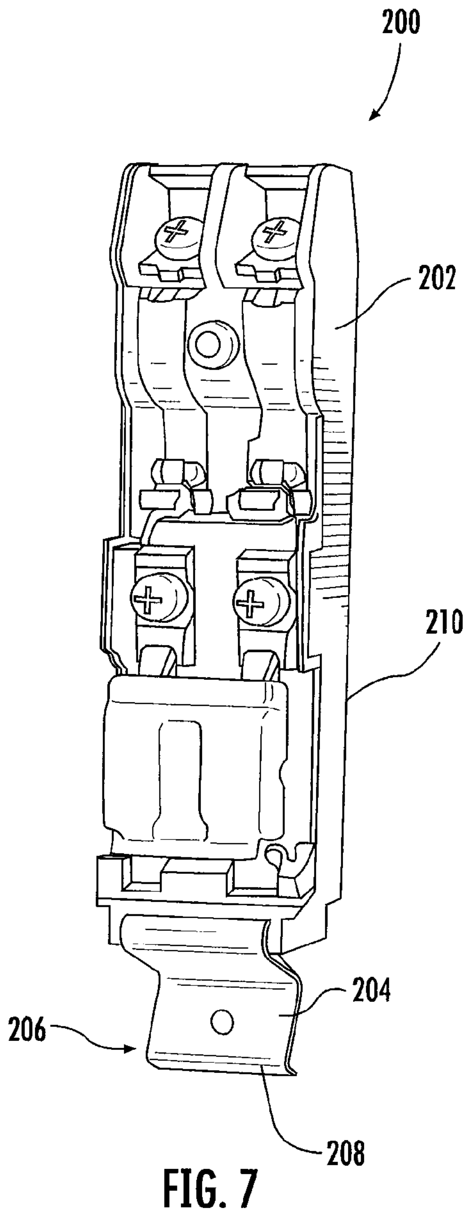
FIG. 7 is a perspective rear view of the auxiliary contact device in FIG. 6.
Figure 8:
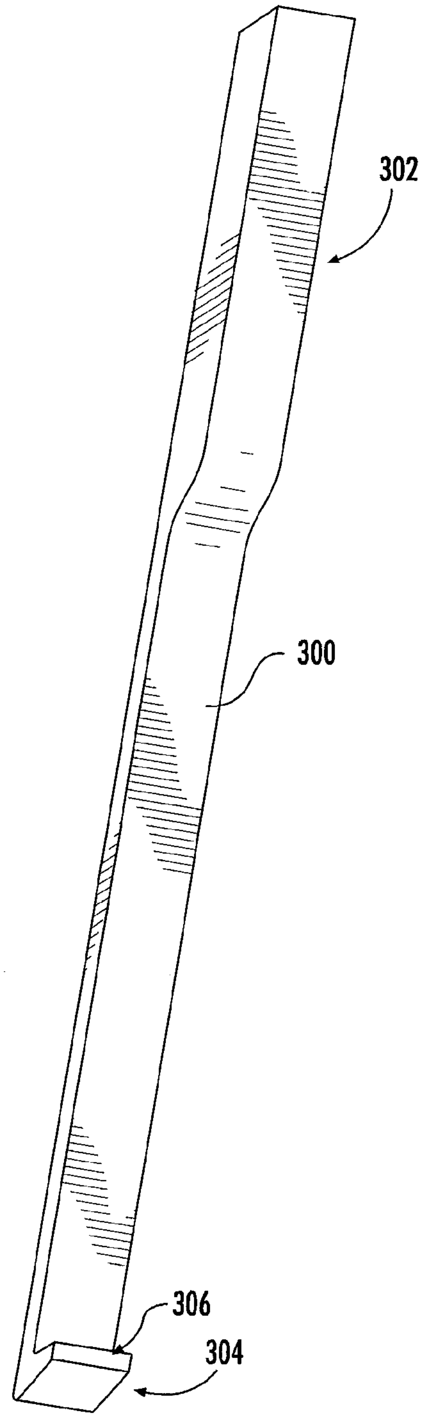
FIG. 8 is a schematic perspective view of an extraction tool, according to one embodiment of the present invention.
Figure 9:
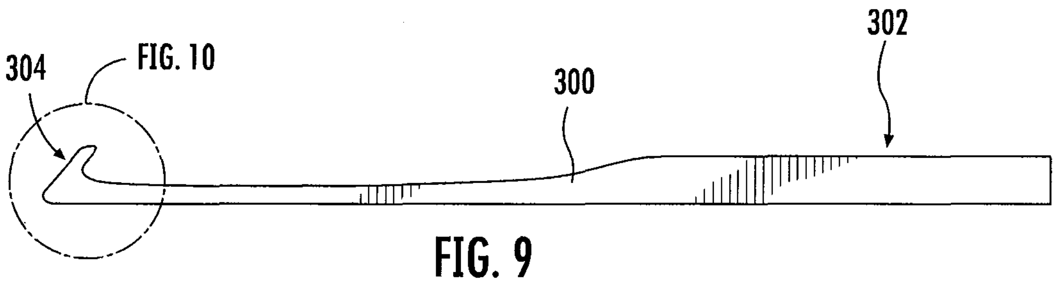
FIG. 9 is a schematic side view of the extraction tool in FIG. 8.
Figure 10:
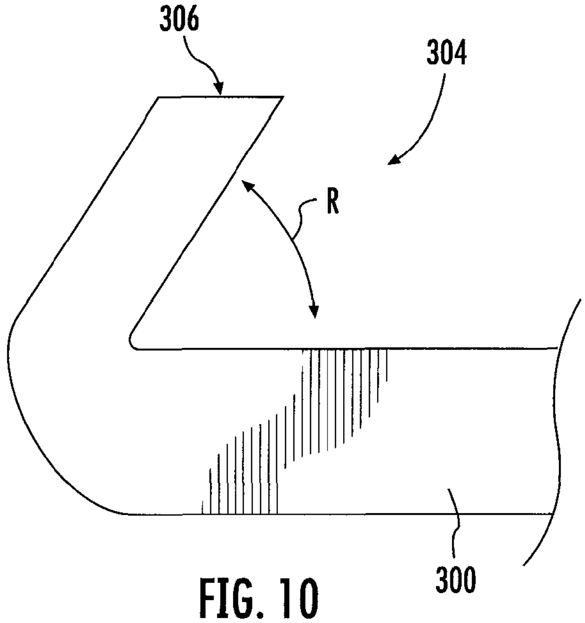
FIG. 10 is a schematic side view of a securement-engaging portion of the extraction tool in FIG. 9.

As shown in FIGS. 6 and 7, the auxiliary contact device 200 may include a contact body 202 and a securement member 204 (e.g., a resilient clip member). The securement member 204 may be attached to, coupled to, or otherwise engaged with the contact body 202 at one end thereof. When the auxiliary contact device 200 is engaged with the motor starter body 152, the securement member 204 is in a compressed state (i.e., compressed toward the contact body 202). That is, the securement member 204 is engaged between the contact body 202 and the motor starter body 152 such that the auxiliary contact device 200 may be secured by the securement member 204 in electrically-conductive engagement with the motor starter assembly 150. The securement member 204 is capable of being moved, flexed, or otherwise deflected so as to release from the motor starter body 152, as will be understood by one of ordinary skill in the art. The securement member 204 may include a terminal end portion 206 which serves as the primary mechanism for actuating/de-actuating the securement member 204 with respect to the motor starter body 152. In this regard, the terminal end portion 206 may include a lateral surface 208 capable of being engaged by one or more fingers. To remove the auxiliary contact device 200, the securement member 204 is deflected and then a back end 210 of the auxiliary contact device 200 is pivoted away from the motor starter body 152 (FIGS. 4 and 5). Representative single auxiliary contact devices are available from ALLEN-BRADLEY such as, for example, the 595-A and 595-B models.

As discussed previously, however, the walls of the housing bucket 120 make it difficult, hazardous, or otherwise prevent an operator from removing the auxiliary contact device 200 by hand when the motor controller unit 100 is positioned within the cabinet 10 of the MCC 1. That is, it is difficult and/or hazardous for an operator to deflect the securement member 204 and simultaneously pivot the contact body 202 of the auxiliary contact device 200 by hand when the motor controller unit 100 is positioned within the cabinet 10 of the MCC 1. As such, to easily remove and/or replace the auxiliary contact device 200, the motor controller unit 100 is typically removed from the cabinet 10 of the MCC 1, which causes a complete system shutdown and leads to downtime of the machinery controlled thereby.

As such, embodiments of the present invention provide a method and apparatus for removing the auxiliary contact device 200 from the motor starter assembly 150 while the motor controller unit 100 is still connected to the MCC 1, such that the overall system for the MCC 1 does not need to be shut down for the replacement procedure. In this regard, as shown in FIGS. 8-13, an extraction tool 300 may be provided according to certain aspects of the present disclosure for facilitating or otherwise assisting in removal of the auxiliary contact device 200 from the motor starter assembly 150. The extraction tool 300 may be configured to engage and deflect the securement member 204 of the auxiliary contact body 200 such that the auxiliary contact body 200 can be removed from the motor starter body 152. In some instances, the extraction tool 300 may also be configured to pivot the back end 210 of the auxiliary contact device 200 away from the motor starter body 152. As previously mentioned, the extraction tool 300 is capable of performing these functions while the motor controller unit 100 is still connected to the MCC 1. The extraction tool 300 may be formed from an insulator or non-conductive material such as, for example, a polycarbonate resin thermoplastic such as LEXAN, which is commercially available from SABIC Innovative Plastics. Further, the extraction tool 300 may be formed from a resilient or pliant material such that the extraction tool can flex and bend to reach the securement member 204. According to one particular embodiment, the overall length of the extraction tool 300 may be approximately 12 inches, although the length can vary.

According to an embodiment, the extraction tool 300 may include a handle portion 302 and a securement-engaging portion 304. The handle portion 302 may be attached to, coupled to, or otherwise engaged with the securement-engaging portion 304. In some instances, the handle portion 302 and the securement-engaging portion 304 are integrally formed as a single workpiece. In other instances, the handle portion 302 and the securement-engaging portion 304 may be discrete and separate components secured together. In this regard, one or both of the handle portion 302 and the securement-engaging portion 304 may be formed of a non-conductive material and/or one or both may be formed of a resilient material. The handle portion 302 may gradually taper toward the securement-engaging portion 304 so as to indicate a wider portion of the handle portion 302 as a gripping area. The handle portion 302 is configured to extend along the auxiliary contact device 200 such that the securement-engaging portion 304 can engage the securement member 204.

Figure 11:
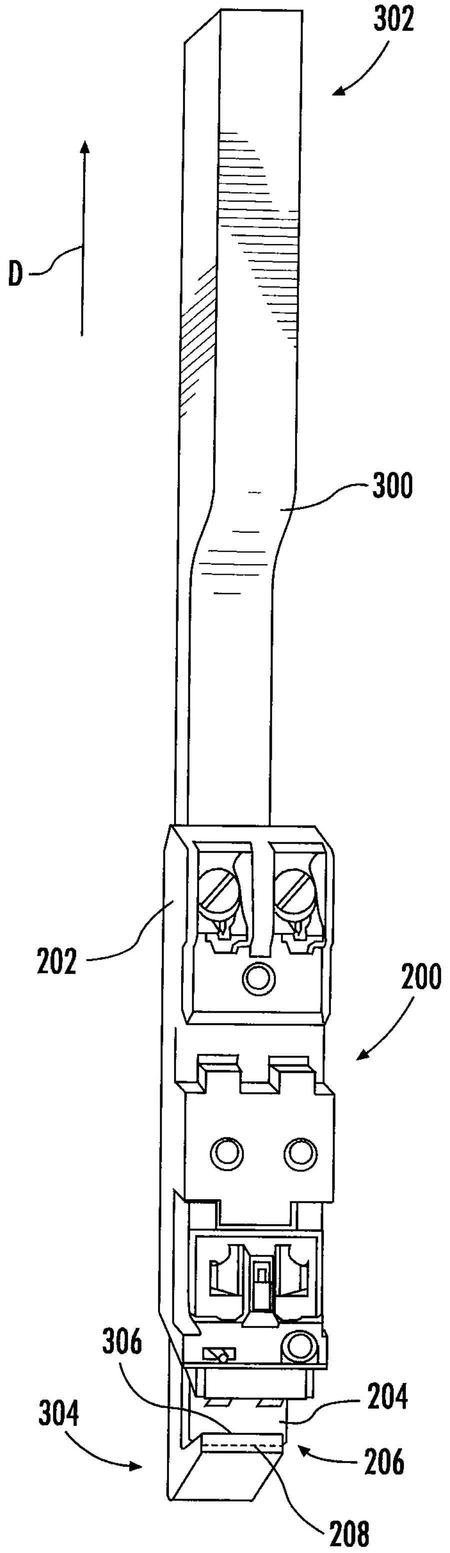
FIG. 11 is a schematic perspective view of an extraction tool engaging an auxiliary contact device, according to one embodiment of the present invention.

The securement-engaging portion 304 may be configured to interact or otherwise engage the securement member 204 of the auxiliary contact device 200. In some instances, the securement-engaging portion 304 may be generally hook-shaped. As shown in FIG. 11, the securement-engaging portion 304 may be configured to extend about the terminal end portion 206 of the securement member 204. While a single auxiliary contact device 200 is shown for illustrative purposes, it is noted that the extraction tool 300 may also be capable of use with, for example, a double auxiliary contact device (not shown) such as, for example, the 595-AB model available from ALLEN-BRADLEY. The securement-engaging portion 304 may include a tip portion 306, which, in some instances, may be beveled to ease positioning or insertion of the securement-engaging portion 304 between the motor starter body 152 and the securement member 204 for deactuating the securement member 204 or otherwise releasing the securement member from engagement with the motor starter body 152. The securement-engaging portion 304 may be set at various angles with respect to the handle portion 302.

In one embodiment, as shown in FIGS. 8-11, the securement-engaging portion 304 may be configured to have a substantially V-shaped profile (i.e., an angle R between the handle portion 302 and the tip portion 306 being approximately less than or equal to 45 degrees). In one particular embodiment, the handle portion 302 may be between about 11-12 inches in length, and the securement-engaging portion 304 may be about 0.5 inches in length. In some embodiments, the width of the handle portion 302 may be about 0.5 inches. In some embodiments, the thickness of the handle portion 302 proximate to the securement-engaging portion 304 may be between about 3/16 and 1/4 inches, while having a thickness of about 0.5 inches at a distal end from the securement-engaging portion 304.

Figure 12:
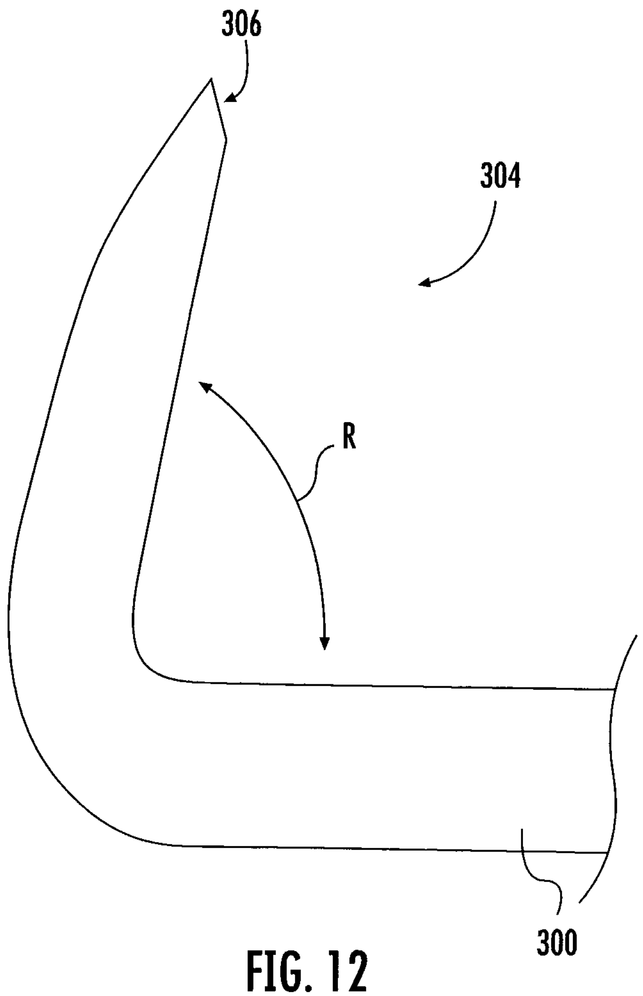
FIG. 12 is a schematic side view of another embodiment of a securement-engaging portion of an extraction tool.

In another embodiment, as shown in FIG. 12, the securement-engaging portion 304 may be configured to have a substantially L-shaped profile (i.e., the angle R between the handle portion 302 and the tip portion 306 being between about 45 and about 90 degrees). The tip portion 306 may extend various lengths from the handle portion 302. For example, a first length (see, e.g., FIG. 10) may be better suited for single auxiliary contact device 200, while a length longer (see, e.g., FIG. 12) than the first length may be better suited for double auxiliary contact devices. In one particular embodiment, the handle portion 302 may be between about 11-12 inches in length, and the securement-engaging portion 304 may be about 1 inch in length. In some embodiments, the width of the handle portion 302 may be about 0.5 inches. In some embodiments, the thickness of the handle portion 302 proximate to the securement-engaging portion 304 may be between about 3/16 and 1/4 inches, while having a thickness of about 0.5 inches at a distal end from the securement-engaging portion 304.

In use, the door member 110 may be removed or otherwise opened such that the motor controller unit 100 and the auxiliary contact device(s) 200 to be removed can be accessed. In some instances, a magnetic starter may be partially disassembled by removing fasteners holding a coil associated therewith in place so as to loosen the auxiliary contact device 200 such that the auxiliary contact device 200 can be removed. The extraction tool 300 is moved within the motor controller unit 100 to reach the auxiliary contact device 200. The tip portion 306 may be wedged or otherwise inserted between the motor starter body 152 and the securement member 204, at least partially through an axial force applied to the handle portion 302 away from the tip portion 306. The securement-engaging portion 304 of the extraction tool 300 may positioned so as to extend about the securement member 204 of the auxiliary contact device 200, as shown in FIG. 11. The handle portion 302 of the extraction tool 300 may be moved generally in direction D by exerting an axial force in the direction thereof, although the pull direction D may be within various angular limits due to the resilient/pliant nature of the extraction tool 300.

Movement of the handle portion 302 in direction D causes the securement-engaging portion 304 to move substantially in the same direction D so as to urge the securement-engaging portion 304 against the lateral surface 208 and/or terminal end portion 206 of the securement member 204. In this regard, the securement member 204 may be deflected so as to release from engagement with the motor starter body 152. The extraction tool 300 may then be used, for example, as a lever, to pivot the auxiliary contact body 202 away from the motor starter body 152 (i.e., pivot the back end 210 of the auxiliary contact device 200 away from the motor starter body 152) to remove the auxiliary contact device 200 therefrom. That is, the handle portion 302 cooperates with the securement-engaging portion 304 to disengage the securement member 204 from between the auxiliary contact device 200 and the motor starter assembly 150, and to disengage the electrically-conductive engagement between the auxiliary contact device 200 and the motor starter assembly 150, so as to remove the auxiliary contact device 200 from the motor starter assembly 150. In this manner, the auxiliary contact device 200 may be removed from the motor starter assembly 150 without shutting down the entire MCC 1.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for removing an elongate auxiliary contact device from a motor starter assembly engaged with a motor controller unit of a motor control center, the auxiliary contact device having opposed ends along a major dimension axis and having a securement member engaged with one of the opposed ends, the securement member being configured to interact with the motor starter assembly to secure the one of the opposed ends of the auxiliary contact device in electrically-conductive engagement with the motor starter assembly, the method comprising:

extending an elongate extraction tool along the major dimension axis of the auxiliary contact device so as to engage a securement-engaging portion of the extraction tool with the securement member securing the one of the opposed ends of the auxiliary contact device in electrically-conductive engagement with the motor starter assembly, such that a handle portion of the extraction tool, the handle portion extending from the securement-engaging portion, extends along the auxiliary contact device outwardly of the motor starter assembly; and exerting an axial force on the handle portion, the securement-engaging portion being responsive to the axial force to disengage the securement member from the motor starter assembly, so as to disengage the electrically-conductive engagement between the auxiliary contact device and the motor starter assembly, and to remove the auxiliary contact device along the major dimension axis thereof away from the motor starter assembly.

2. A method according to claim 1 wherein extending an elongate extraction tool further comprises extending an elongate extraction tool comprised of a non-conductive material along the major dimension axis of the auxiliary contact device so as to engage the securement-engaging portion of the extraction tool with the securement member.

3. A method according to claim 1 wherein extending an elongate extraction tool further comprises extending an elongate extraction tool along the major dimension axis of the auxiliary contact device so as to insert a beveled tip portion of the securement-engaging portion of the extraction tool between the securement member and the motor starter assembly.

4. A method according to claim 1 wherein extending an elongate extraction tool further comprises extending an elongate extraction tool along the major dimension axis of the auxiliary contact device so as to at least partially insert the securement-engaging portion of the extraction tool, the securement-engaging portion being configured to have a substantially V-shaped profile, between the securement member and the motor starter assembly.

5. A method according to claim 1 wherein extending an elongate extraction tool further comprises extending an elongate extraction tool along the major dimension axis of the auxiliary contact device so as to at least partially insert the securement-engaging portion of the extraction tool, the securement-engaging portion being configured to have a substantially L-shaped profile, between the securement member and the motor starter assembly.

6. A method according to claim 1 wherein extending an elongate extraction tool further comprises extending an elongate extraction tool comprised of a resilient material along the major dimension axis of the auxiliary contact device so as to engage the securement-engaging portion of the extraction tool with the securement member.

* * * * *

UNITED STATES PATENT AND TRADEMARK OFFICE

CERTIFICATE OF CORRECTION

PATENT NO. : 8,516,677 B2
APPLICATION NO. : 12/796006
DATED : August 27, 2013
INVENTOR(S) : Coleman, Sr. et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 303 days.

Signed and Sealed this
Twenty-ninth Day of April, 2014

Michelle K. Lee

Michelle K. Lee
*Deputy Director of the United States Patent and Trademark Office*